United States Patent
Kim et al.

(10) Patent No.: US 6,563,780 B2
(45) Date of Patent: May 13, 2003

(54) COMPATIBLE OPTICAL PICKUP FOR HIGH-DENSITY RECORDING/REPRODUCTION

(75) Inventors: Tae-kyung Kim, Suwon (KR); Chong-sam Chung, Suwon (KR); Young-man Ahn, Suwon (KR); Hea-jung Suh, Seongnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 220 days.

(21) Appl. No.: 09/793,718

(22) Filed: Feb. 27, 2001

(65) Prior Publication Data

US 2001/0036141 A1 Nov. 1, 2001

(30) Foreign Application Priority Data

Mar. 4, 2000 (KR) ........................................ 2000-10875

(51) Int. Cl.$^7$ ................................................ G11B 7/00
(52) U.S. Cl. .............................. 369/112.01; 369/44.32; 369/94
(58) Field of Search .................. 369/112.01, 112.05, 369/112.07, 112.04, 44.27, 44.28, 44.32, 44.41, 53.28, 53.1, 53.12, 53.18, 53.19, 94

(56) References Cited

U.S. PATENT DOCUMENTS 6,285,646 B1 * 9/2001 Yoo et al. .............. 369/112.26
6,392,977 B2 * 5/2002 Ando et al. ............ 369/112.01

* cited by examiner

*Primary Examiner*—Muhammad Edun
(74) *Attorney, Agent, or Firm*—Staas & Halsey LLP

(57) ABSTRACT

An optical pickup compatible with optical discs having different formats. A first light source emits a first light beam suitable for a first format optical disc. An objective lens is optimized for a wavelength of the first light source. Light reflected from the first optical disc provides a reproduction signal. A second light source emits a second light beam suitable for a second format optical disc. A light splitter splits the second light beam and the objective lens focuses the split beams onto the second disc as a main light spot and a sub-light spot. Lights reflected from the main light spot and the sub-light spot are independently detected and then processed to correct for chromatic aberration caused by a difference in the wavelengths of the first and second light beams and/or spherical aberration caused by thickness difference between the first and second format optical discs.

21 Claims, 9 Drawing Sheets

COMPATIBLE OPTICAL PICKUP FOR HIGH-DENSITY RECORDING/ REPRODUCTION

CROSS-REFERENCE TO RELATED APPLICATIONS

This application claims the benefit of Korean Application No. 00-10875 filed Mar. 4, 2000, in the Korean Patent Office, the disclosure of which is incorporated herein by reference.

BACKGROUND OF THE INVENTION

1. Field of the Invention

The present invention relates to an optical pickup for high-density recording/reproduction compatible for optical discs having different formats, and more particularly, to an optical pickup for high-density recording/reproduction adopting a single objective lens, which is compatible for optical discs having different formats, and corrects for chromatic aberration caused by different wavelengths of light and/or spherical aberration due to differences in thickness of optical discs.

2. Description of the Related Art

Optical pickups are a device for recording information on or reproducing information from an optical disc by focusing a laser beam on the optical disc with an objective lens. The recording and reproduction capacity is determined by the size of a focused spot. The size of the focused spot is related with a wavelength ($\lambda$) of the laser beam, and a numerical aperture (NA) of the objective lens, as shown in equation (1):

$$\text{size of focused spot} \propto \lambda/NA \qquad (1)$$

For a higher recording density of about 15 gigabytes or more, the size of the spot being focused on the optical disc must be further reduced. To form a small spot for high-density recording, as can be inferred from equation (1), it is essential to adopt a blue laser as a light source, which emits light having a short wavelength of about 410 nm, and an objective lens having an NA of 0.6 or more.

On the other hand, coma $W_{31}$, which occurs due to tilting of the optical disc, is associated with a tilt angle ($\theta$) of the information recording surface of the disc with respect to an optical axis, a refractive index (n) of the disc substrate, the thickness (d) of the disc substrate, and the NA of the objective lens, as expressed by equation (2):

$$W_{31} = -\frac{d}{2} \cdot \frac{n^2(n^2-1)\sin\theta\cos\theta}{(n^2-\sin^2\theta)^{5/2}} NA^3 \qquad (2)$$

To ensure tolerance with respect to the tilt of disc for high density recording, there is a tendency of reducing the thickness (d) of the disc substrate. For example, compact discs (CDs) have a thickness of 1.2 mm and digital versatile discs (DVDs) have a thickness of 0.6 mm. Also, there is a high possibility that the thickness of future generation DVD family media (so-called high-definition (HD)-DVDs), which are recently being developed, is determined to be 0.6 mm or less.

Optical pickups for high-density recording/reproduction in/from future generation DVDs adopt a light source which emits a blue laser beam, and an objective lens optimized to be suitable for the blue laser beam and the thickness of a future generation DVD substrate.

For compatibility with existing discs, such as DVDs, the optical pickup for high-density recording and reproduction needs another light source which emits a red laser beam. The reason why both blue and red light sources are adopted in the optical pickup for future generation DVDs is for compatibility with DVD-recordable (DVD-R) and multi-layered DVDs, which have a low reflectivity with respect to blue light.

The objective lens of the optical pickup for future generation DVDs is designed to be suitable for blue light and the thickness of a future generation DVD substrate. Thus, when a DVD is adopted as a recording medium, a red light spot focused on the recording surface of the DVD by the objective lens includes chromatic aberration due to a difference in wavelengths of red and blue light. In addition, when the thickness of a future generation DVD substrate used is different from that of a DVD substrate, spherical aberration caused by the thickness difference of the discs occurs.

FIG. 1 illustrates the optical path difference ($OPD_{rms}$) in an optical pickup adopting an objective lens designed exclusively for 405 nm light with respect to wavelength variations of light incident on the objective lens. In FIG. 1, $OPD_{rms}$ refers to the amount of aberration in a light spot focused by the objective lens and is expressed in wavelengths.

As shown in FIG. 1, when 405 nm light is incident on the objective lens, almost no aberration occurs, so that the $OPD_{rms}$ at 405 nm is close to zero. In contrast, when 650 nm light is incident on the objective lens, the $OPD_{rms}$ at a wavelength of 650 nm becomes 0.15$\lambda$ due to increased aberration.

Thus, in consideration of a standard aberration allowance, i.e., $OPD_{rms}=0.07\lambda$, in the related field, the optical pickup for future generation DVDs, which is designed to focus 650 nm light with the objective lens optimized for 405 nm light, is not compatible with DVDs. In other words, for the compatibility with DVDs, the optical pickup for future generation DVDs needs to correct for chromatic and/or spherical aberration mentioned previously.

Referring to FIG. 2, a conventional aberration correcting apparatus includes an objective lens 3 which focuses an incident beam and a condensing lens 5 which further condenses the beam focused by the objective lens 3 to form a light spot on an optical disc 1. As shown in FIG. 3, a distance between the condensing lens 5 and the objective lens 3 is adjusted according to thickness variations ($\Delta$d) of the optical disc substrate 1 and wavelength variations of light used, such that aberration is corrected.

However, as for such a conventional aberration correcting apparatus adopting two lenses, the condensing lens 5 and the objective lens 3, assembling the two lenses is complicated. Also, the objective lens 3 and the condensing lens 5 must be actuated for both tracking and focusing control, and adjusting the distance between the objective lens 3 and the condensing lens 5, so the structure of the entire actuator becomes complicated.

SUMMARY OF THE INVENTION

To solve the above problems, it is an object of the present invention to provide an optical pickup for high-density recording/reproduction adopting a single objective lens, in which chromatic aberration caused by different wavelengths of light and/or spherical aberration due to thickness variations of optical discs is corrected, and thus the optical pickup is compatible for optical discs having different formats.

Additional objects and advantages of the invention will be set forth in part in the description which follows, and, in part, will be obvious from the description, or may be learned by practice of the invention.

To achieve the above object and other objects of the present invention, there is provided an optical pickup compatible for optical discs having different formats. A first light source emits a beam having a relatively short wavelength suitable for a first optical disc with a format and a second light source emits a beam having a relatively long wavelength suitable for a second optical disc with another format. An objective lens, designed to be suitable for the first optical disc and the wavelength of the beam emitted from the first light source, focuses an incident beam to form a light spot on a corresponding optical disc. An optical path changing system alters a traveling path of the beams emitted from the first and second light sources. A first photodetector receives and photoelectrically converts the beam reflected from a corresponding optical disc and passed through the objective lens after having been emitted from the first light source. A first signal processing unit detects a reproduction signal of the first optical disc from the signal output from the first photodetector. A first light splitter splits an incident beam into at least two beams including first and second beams to be focused as a main light spot and a sub-light spot, respectively, on the second optical disc after having been emitted from the second light source. A second photodetector comprises first and second light receiving portions which respectively receive and photoelectrically convert the first and second beams reflected from the corresponding optical disc after having been emitted from the second light source. A second signal processing unit processes the electrical signals output from the first and second light receiving portions of the second photodetector to correct for chromatic aberration caused by a difference in the wavelengths of the beams emitted from the first and second light sources and/or spherical aberration caused by a thickness difference between the first and second optical discs, thereby detecting a reproduction signal of the second optical disc.

It is preferable that the first light source emits blue light and the second light source emits red light. It is preferable that the first light splitter is a holographic optical element (HOE) which causes a predetermined amount of spherical aberration only to the second beam, such that the second beam further includes spherical aberration relative to the first beam. In this case, the second signal processing unit may further comprise a delay between an output of the first and/or second light receiving portions and at least one input of the second processing unit, to delay one of the signals output from the first and second light receiving portions to match the phases of the electrical signals.

It is preferable that the first light splitter is a polarization holographic optical element (HOE) which generates a first beam having one polarized component and a second beam having another polarized component, and which causes a predetermined amount of spherical aberration only to the second beam having the another polarized component, such that the second beam further includes spherical aberration relative to the first beam. Preferably, the optical pickup further comprises a polarization beam splitter which transmits or reflects the first and second beams reflected from the second optical disc according to the polarization of the first and second beams, wherein the first and second light receiving portions of the second photodetector are arranged to separately receive the first and second beams having different polarized components split by the polarization beam splitter.

Assuming that a main reproduction signal from the main light spot, which has been received and photoelectrically converted by the first light receiving portion, is $S_m$, a sub-reproduction signal from the sub-light spot, which has been received and photoelectrically converted by the second light receiving portion, is $S_{sub}$, and k is a gain factor, the second signal processing unit preferably process the signals output from the first and second light receiving portions using equation (3) below, to output a final reproduction signal S from which chromatic aberration caused by different wavelengths of the beams emitted from the first and second light sources, and/or spherical aberration caused by thickness difference between the first and second optical discs, are corrected:

$$S=S_m+k(S_m-S_{sub}) \qquad (3)$$

BRIEF DESCRIPTION OF THE DRAWINGS

The above object and advantages of the present invention will become more apparent by describing in detail embodiments thereof with reference to the attached drawings in which.

DESCRIPTION OF THE PREFERRED EMBODIMENTS

Figure 1:
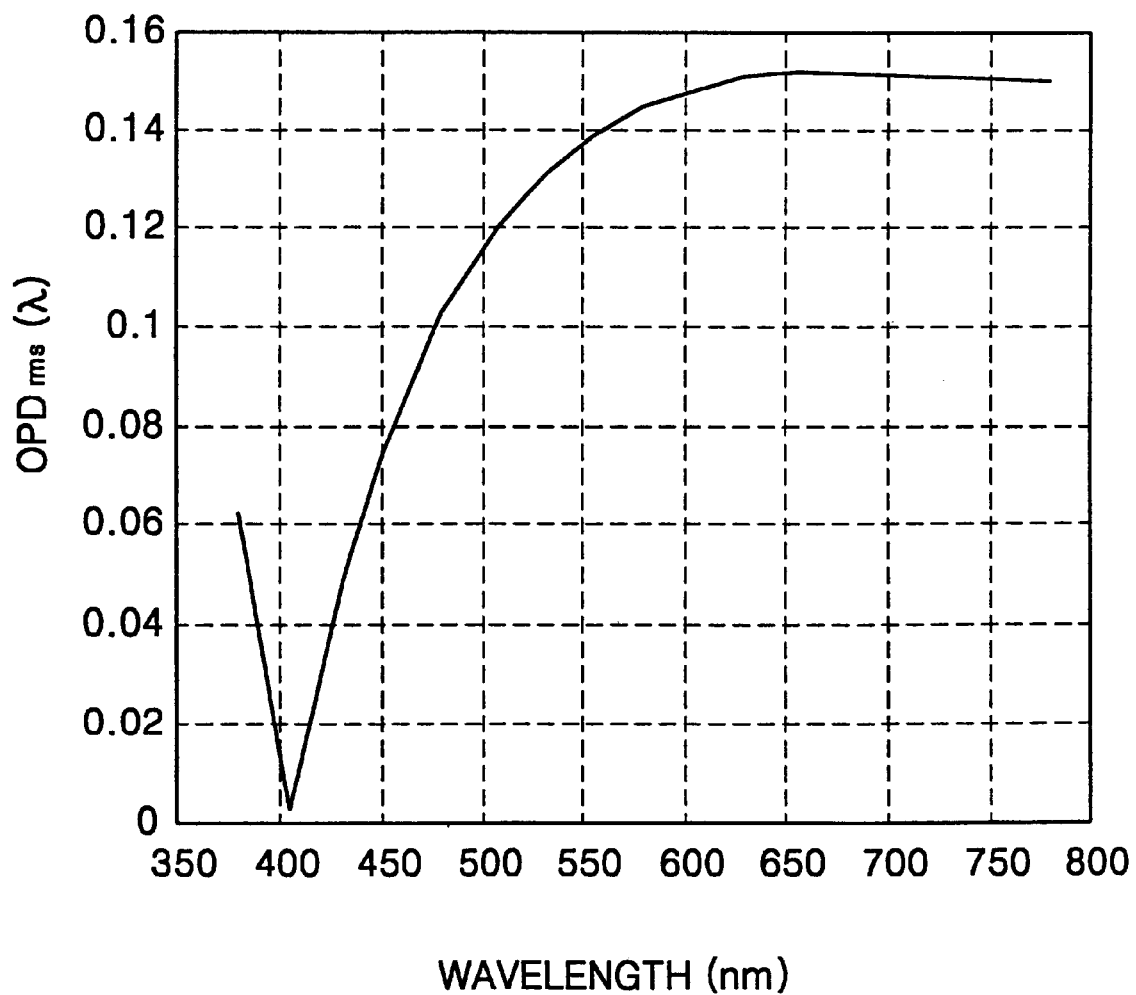
FIG. 1 is a graph illustrating optical path difference ($OPD_{rms}$) with respect to wavelength variations of light incident on an objective lens optimized for 405 nm light.
Figure 2:
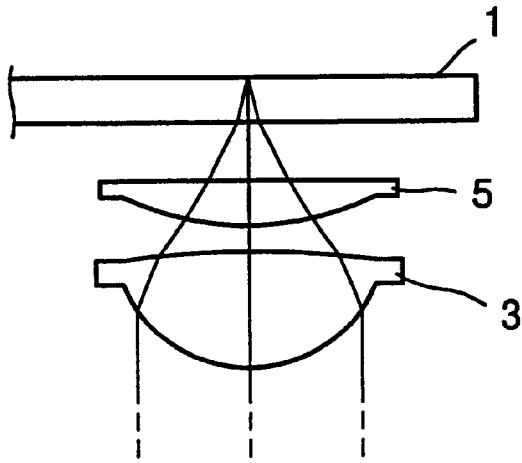
FIG. 2 is a schematic view of a conventional aberration correcting apparatus.
Figure 3:
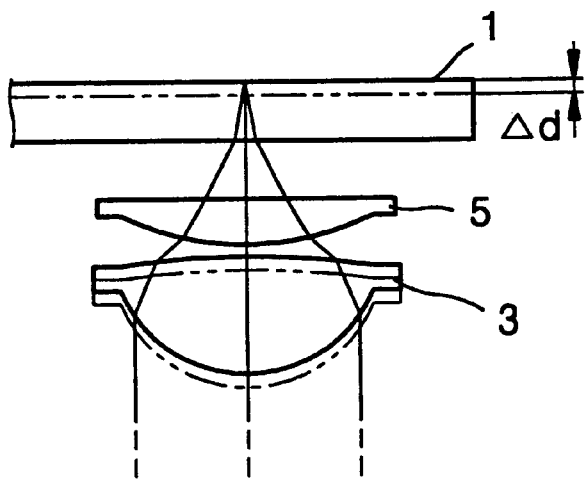
FIG. 3 illustrates the operation of the conventional aberration correcting apparatus of FIG. 2.

Reference will now be made in detail to the present embodiments of the present invention, examples of which are illustrated in the accompanying drawings, wherein like reference numerals refer to like elements throughout.

Figure 4:
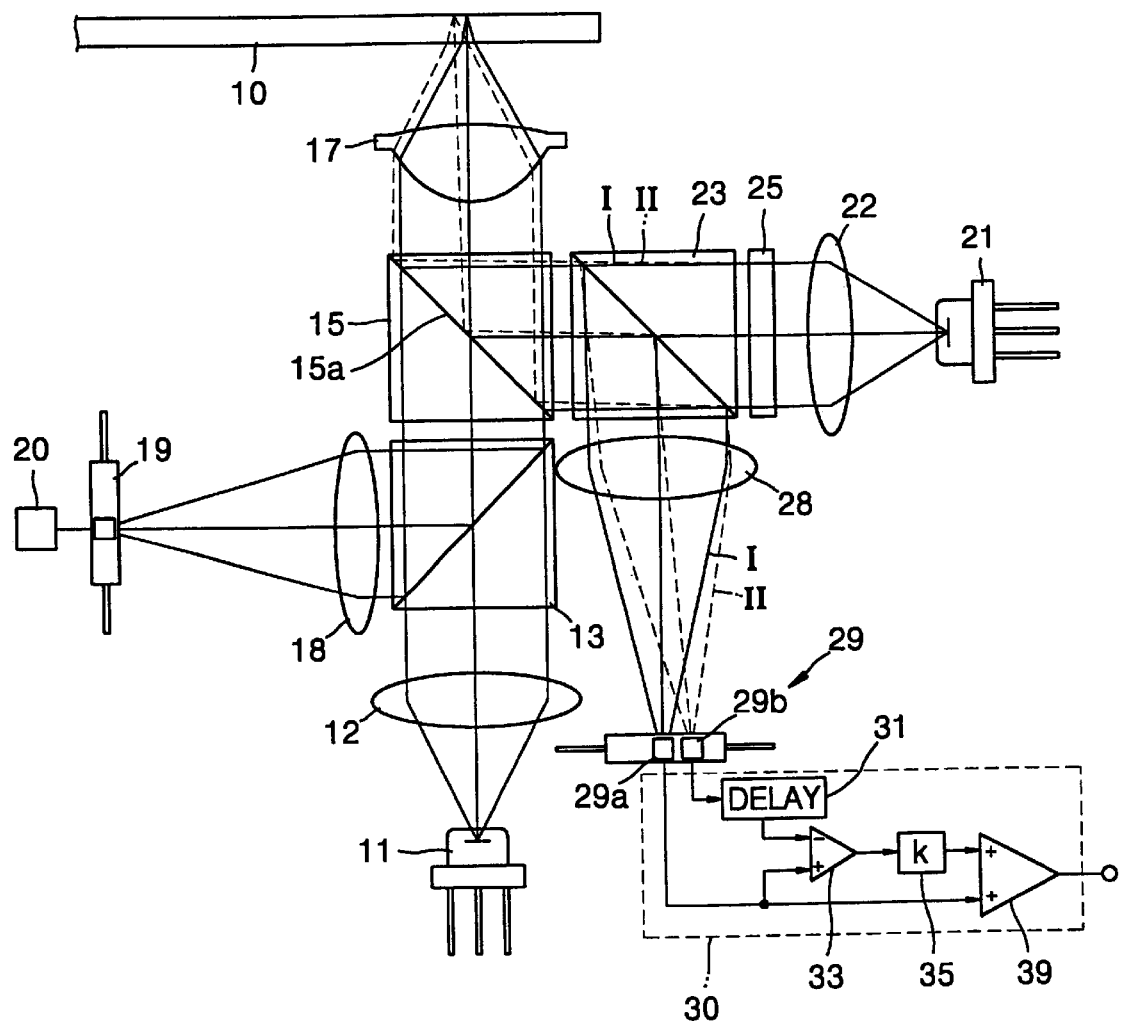
FIG. 4 is a diagram illustrating the optical arrangement of a compatible optical pickup for high-density recording and reproduction according to an embodiment of the present invention.

Referring to FIG. 4, an embodiment of a compatible optical pickup for high-density recording/reproduction according to the present invention is illustrated. First and second light sources 11 and 21 emit laser beams having different wavelengths. An objective lens 17 focuses an incident beam to form a light spot on an optical disc 10. First, second and third optical path changers 13, 23 and 15, respectively, alter the traveling path of an incident beam. A light splitter splits the beam incident from the second light source 21 so as to form at least two light spots on the optical disc 10. First and second photodetectors 19 and 29, respectively, receive beams reflected from the optical disc 10 to detect signals through photoelectric conversion. First and second signal processing units 20 and 30, respectively, detect a reproduction signal of the optical disc 10 from the signals detected by the first and second photodetectors 19 and 29.

In the present embodiment, the optical disc 10 is a first optical disc or a second optical disc which have different formats. The first optical disc may be, for example, a future generation digital versatile disc (so-called, high-definition (HD)-DVDs) family media with a substrate thickness of 0.6 mm or less (the thickness from the light incident surface to the information recording surface), and the second optical disc may be, for example, DVD family media (hereinafter, referred to as DVDs) with a substrate thickness of 0.6 mm.

The first light source 11, the first optical path changer 13, the first photodetector 19 and the first signal processing unit 20 are used for recording an information signal on and/or reproducing an information signal from the first optical disc. In particular, the first light source 11 emits a relatively short wavelength of light, for example, about 400 nm light, suitable for the first optical disc. A diverging beam emitted from the first light source 11 is collimated by a collimating lens 12.

The first optical path changer 13 includes, for example, a cubic type beam splitter which transmits a portion of the incident beam and reflects the remainder of the incident beam, as shown in FIG. 4. Alternatively, the beam splitter may be a flat type or prism type beam splitter, rather than the cubic type beam splitter shown in FIG. 4.

Alternatively, the first optical path changer 13 may include a polarization beam splitter (not shown) which transmits or reflects the incident beam according to a polarization thereof to alter the traveling path of the incident beam, and a phase retardation plate (not shown) which is disposed on the optical path between the polarization beam splitter and the third optical path changer 15 to cause a lag in-phase to the incident beam. Preferably, the phase retardation plate is a quarter-wave plate which retards the phase of the incident beam by k/4.

The objective lens 17 is optimized for the substrate thickness of the first optical disc and the wavelength of light emitted from the first light source 11, and has an NA of 0.6 or more. For this reason, when light emitted from the second light source 21 is focused on the optical disc 10 by the objective lens 17, chromatic aberration occurs due to a difference in wavelengths of the beams from the first and second light sources 11 and 21. In addition, when the substrate thickness of the first optical disc is different from that of the second optical disc, as will be described below, spherical aberration occurs in the light spot focused on the second optical disc after having been emitted from the second light source 21, due to a difference in substrate thicknesses. However, the chromatic aberration and/or spherical aberration are corrected by the light splitter, the second photodetector 29 and the second signal processing unit 30, as will be described below, and thus the optical pickup according to the present invention is compatible with the first and second optical discs.

The third optical path changer 15 is disposed on an optical path between the first optical path changer 13 and the objective lens 17. The third optical path changer 15 transmits one of the beams emitted from the first and second light sources 11 and 21, and reflects the other beam, to change the traveling path of the beams emitted from the first and second light sources 11 and 21. The third optical path changer 15 may be a beam splitter with a mirror surface 15a which transmits the beam emitted from the first light source 11 and reflects the beam emitted from the second light source 21. Preferably, the mirror surface 15a is coated to transmit blue light and reflect red light.

The first photodetector 19 receives a beam reflected from the first optical disc after having been emitted from the light source 11, through the objective lens 17, the third optical path changer 15 and the first optical path changer 13 in succession, and detects signals from the received beam through photoelectric conversion. The first signal processing unit 20 detects a reproduction information signal from the first optical disc using the signals detected by the first photodetector. In the present embodiment, as described previously, the optical pickup records an information signal on a future generation DVD and reproduces a recorded information signal from a future generation DVD.

The second light source 21, the second optical path changer 23, the light splitter, the second photodetector 29 and the second signal processing unit 20 cooperatively record an information signal on and/or reproduce an information signal from the second optical disc. In particular, the second light source 21 emits a relatively long wavelength of light, for example, about 650 nm light, suitable for the second optical disc. A diverging beam emitted from the second light source 21 is collimated by a collimating lens 22.

The collimated beam is split into at least two beams including a first beam I and a second beam II by the light splitter. The first and second beams I and II are focused through the objective lens 17 on the optical disc 10, to form a main light spot and a sub-light spot. Preferably, the light splitter includes a: holographic optical element (HOE) 25 which causes a predetermined amount of spherical aberration to the second beam II, as well as splitting the incident beam into the first and second beams I and II. In this case, the first beam I is the $0^{th}$ order beam diffracted by the HOE 25, and the second beam II is the $\pm 1^{st}$ order beam diffracted by the HOE 25.

The second optical path changer 23 is arranged on the optical path between the HOE 25 and the third optical path changer 15 and alters the traveling path of the incident beam. In particular, light incident from the second light source 21 is directed toward the third optical path changer 15 by the second optical path changer 23, and light incident from the third optical path changer 15 is directed toward the second photodetector 19 by the second optical path changer 23. Like the first optical path changer 13, the second optical path changer 23 may be a beam splitter, or a combination of a polarization beam splitter (PBS) and a phase retardation plate.

The first and second beams I and II from the HOE 25 pass through the second and third optical path changers 23 and 15 in sequence, and are focused by the objective lens 17 on a same track of the optical disc 10 as a main light spot and a sub-light spot.

The main light spot and the sub-light spot on the optical disc 10 include chromatic aberration caused by a difference in wavelengths of light emitted from the first and second light sources 11 and 21. Where the second optical disc whose substrate thickness is different from that of the first optical disc is used, the main light spot and the sub-light spot also include spherical aberration caused by a difference in substrate thicknesses. Compared with the main light spot, the sub-light spot further includes spherical aberration intentionally introduced by the HOE 25.

After having been reflected from the optical disc 10, the first and second reflected beams I and II are received by the second photodetector 29 through the objective lens 17, the third optical path changer 15, the second optical path changer 23, and a condensing lens 28. The condensing lens 28 condenses the first and second reflected beams I and II passed through the second optical path changer 23. The second photodetector 29 includes first and second light receiving portions 29a and 29b which receive the first and second reflected beams I and II, respectively.

The second signal processing unit 30 corrects for chromatic aberration and/or spherical aberration due to thickness difference, which are described previously, from electrical signals obtained through photoelectric conversion by the first and second light receiving portions 29a and 29b, and outputs a reproduction signal. In particular, the second signal processing unit 30 includes a differential unit 33 which subtracts the signals output from the first and second receiving portions 29a and 29b, a gain controller 35 which amplifies a subtraction signal output from the differential unit 33 with a gain factor k, and an adder 39 which sums a signal output from the gain controller 33 and the signal output from the first receiving portion 29a.

In other words, when an information signal is reproduced from the second optical disc, the second signal processing unit 30 processes the detection signals output from the first and second light receiving portions 29a and 29b using equation (3) below, and outputs a reproduction signal S from which chromatic aberration and spherical aberration due to thickness difference have been corrected:

$$S = S_m + k(S_m - S_{sub}) \quad (3)$$

where $S_m$ represents a main reproduction signal that originates from the main light spot, which has been received and converted into an electrical signal by the first light receiving portion 29a, $S_{sub}$ represents a sub-reproduction signal that originates from the sub-light spot, which has been received and converted into an electrical signal by the second light receiving portion 29b, and k is a gain factor.

The gain factor k varies according to the degree of the thickness difference between the first and second optical discs, and is controlled by a k-value adjusting circuit (not shown) such that jitter of the reproduction signal from the second optical disc is minimized. In this case, preferably, the k-value adjusting circuit monitors jittering of the reproduction signal output from the second signal processing unit 30, adjusts the gain factor k according to the monitoring result, and feeds back the result to the gain controller 35 for gain control.

Where two light spots, a main light spot and a sub-light spot, are focused on the same track of the optical disc 10, as described previously, the sub-light spot is separated from the main light spot in the track direction of the optical disc. Accordingly, it is preferable that the second signal processing unit 30 further comprises a delay 31, as shown in FIG. 4, to compensate for a time delay between the signals originating from the two light spots. For example, the delay 31 is installed between the output of the second light receiving portion 29b and an input of the differential unit 33. The delay 31 delays a phase of the preceding signal, for example, output from the second light receiving portion 29b, to match the phases of the signals output from the first and second light receiving portions 29a and 29b.

In the operation of the optical pickup having the configuration described with reference to FIG. 4, where a future generation DVD family optical disc with a first format is used as the optical disc 10, the first light source 11 operates to emit blue light. A diverging beam emitted from the first light source 11 is collimated by the collimating lens 12. The collimated beam passes through the first and third optical path changers 13 and 15 in succession, and is incident on the objective lens 17. The objective lens 17 focuses the incident beam to form a light spot on the recording surface of the optical disc with the first format. For example, if the optical disc with the first format is recordable, an information signal can be recorded by the light spot focused on the recording surface.

Light reflected from the optical disc with the first format is incident on the first optical path changer 13 through the objective lens 17 and the third optical path changer 13 in succession. The incident beam is reflected by the first optical path changer 13, condensed by the condensing lens 18 and received by the first photodetector 19. During reproduction, an electrical signal detected by the first photodetector 19 is provided to the first signal processing unit 20, and the first signal processing unit 20 outputs an information signal reproduced from the optical disc with the first format. It will be appreciated that the detection signals of the first photodetector 19 are also used in detecting focusing and tracking error signals such that the objective lens 17 scans along the track center of the optical disc in a normal focus position.

Where a DVD family optical disc with a second format is used as the optical disc 10, the second light source 21 is operated to emit red light. A diverging beam emitted from the second light source 21 is collimated by the collimating lens 22 and diffracted by the HOE 25 to split into a first beam I, and a second beam II including spherical aberration.

The first and second beams I and II transmit through the second optical path changer 23, are reflected by the third optical path changer 15 and are incident on the objective lens 17. The objective lens 17 focuses the incident first and second beams I and II to form a main light spot and a sub-light spot on the same track of the recording surface of the optical disc with the second format. Where the optical disc with the second format is recordable, an information signal can be recorded by the main light spot focused on the recording surface.

The first and second beams I and II are reflected by the optical disc with the second format, transmitted through the objective lens 17, directed toward the second optical path changer 23 by the third optical path changer 15, reflected by the second optical path changer 23, condensed by the condensing lens 28, and received by the first and second light receiving portions 29a and 29b, respectively, of the photodetector 29. During reproduction, electrical signals detected by the first and second light receiving portions 29a and 29b are input to the second signal processing unit 30, and the second signal processing unit 30 outputs an information signal reproduced from the optical disc with the second format, from which chromatic aberration and/or spherical aberration caused by thickness difference of optical discs described previously are/is removed.

Like the detection signal of the first photodetector 19, it is appreciated that the detection signals of the second photodetector 29 can also be used in detecting focusing and tracking error signals such that the objective lens 17 scans along the track center of the optical disc in a normal focus position.

The operation of the compatible optical pickup shown in FIG. 4 according to the present invention will be further described with reference to FIGS. 5 through 11. It will be described how a reproduction signal, without chromatic and/or spherical aberration caused by substrate thickness of optical discs, is generated, where the optical disc with the second format, a DVD family optical disc, is used.

Figure 5:
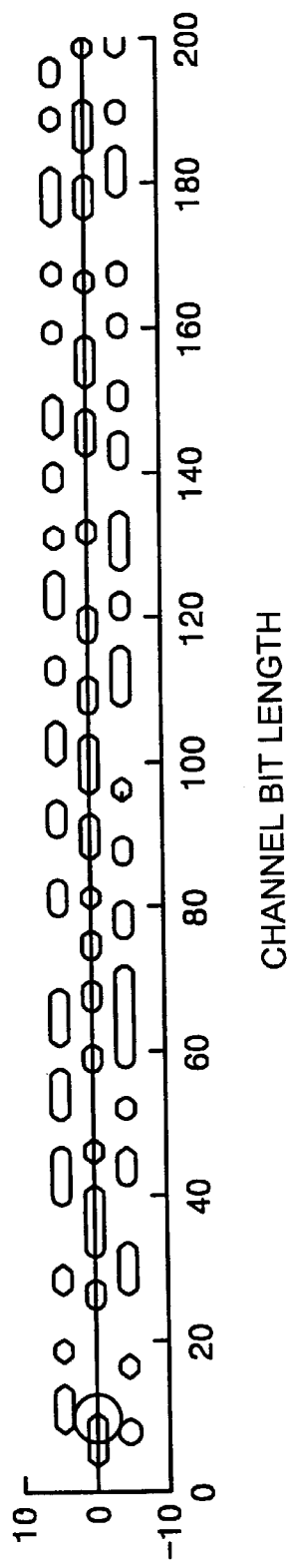
FIG. 5 is a plan view of a part of a digital versatile disc (DVD), showing only three lines of pits with 0.74 μm track pitch and 0.40 μm minimum mark length.
Figure 6:
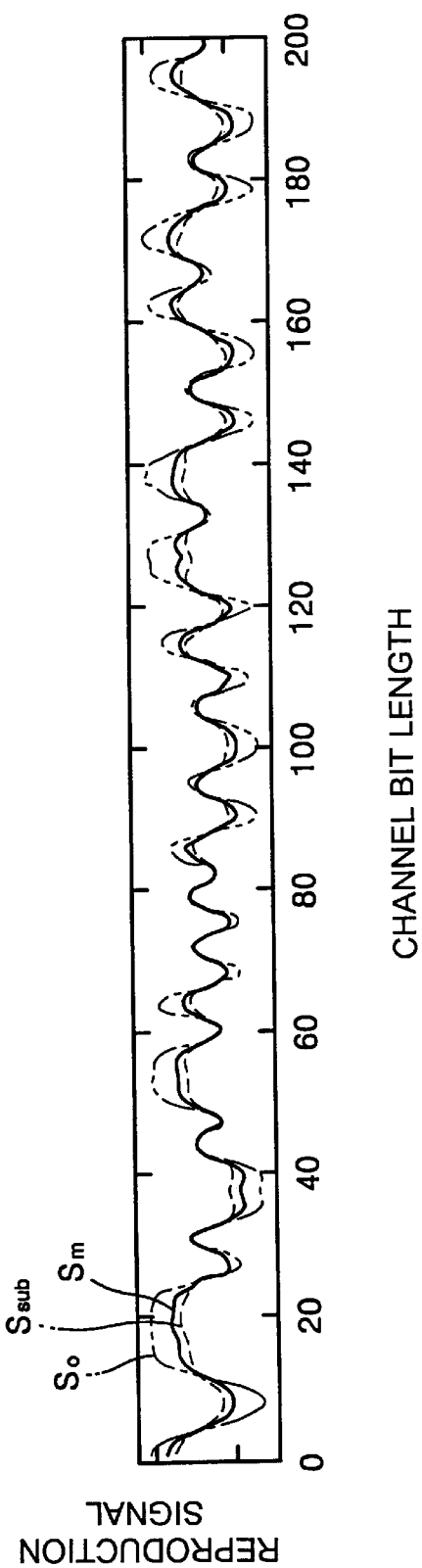
FIG. 6 is a graph illustrating a signal reproduced from the central track of FIG. 5.

FIG. 5 illustrates a part of a DVD having three pit streams with 0.74 μm track pitch and 0.40 μm minimum mark length, and FIG. 6 illustrates a signal reproduced from the central track of the part of the DVD shown in FIG. 5.

Figure 7:
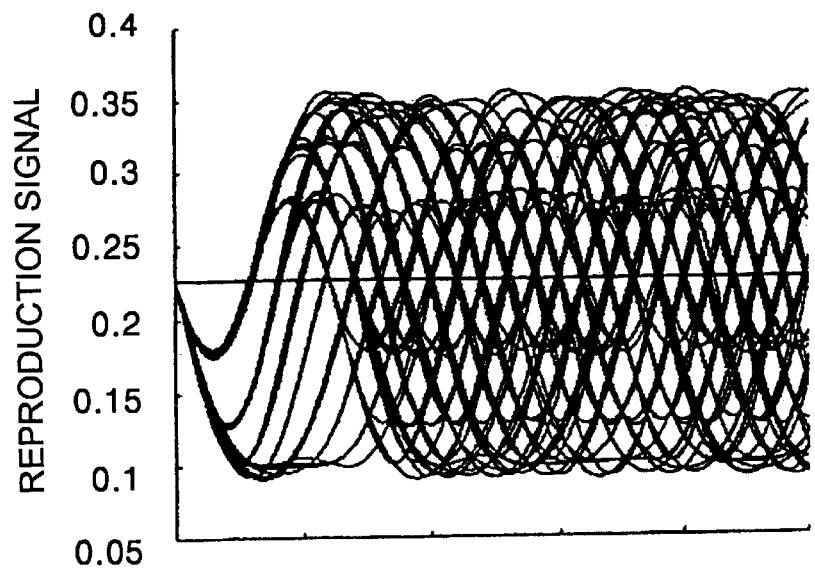
FIG. 7 illustrates an eye-patterns of the signal $S_o$ of FIG. 6.
Figure 8:
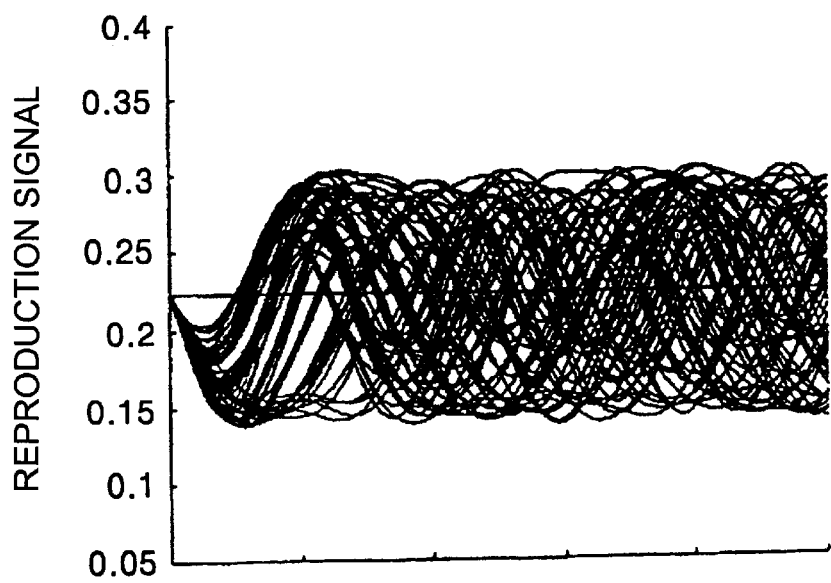
FIG. 8 illustrates an eye-pattern of the signal $S_m$ of FIG. 6.
Figure 9:
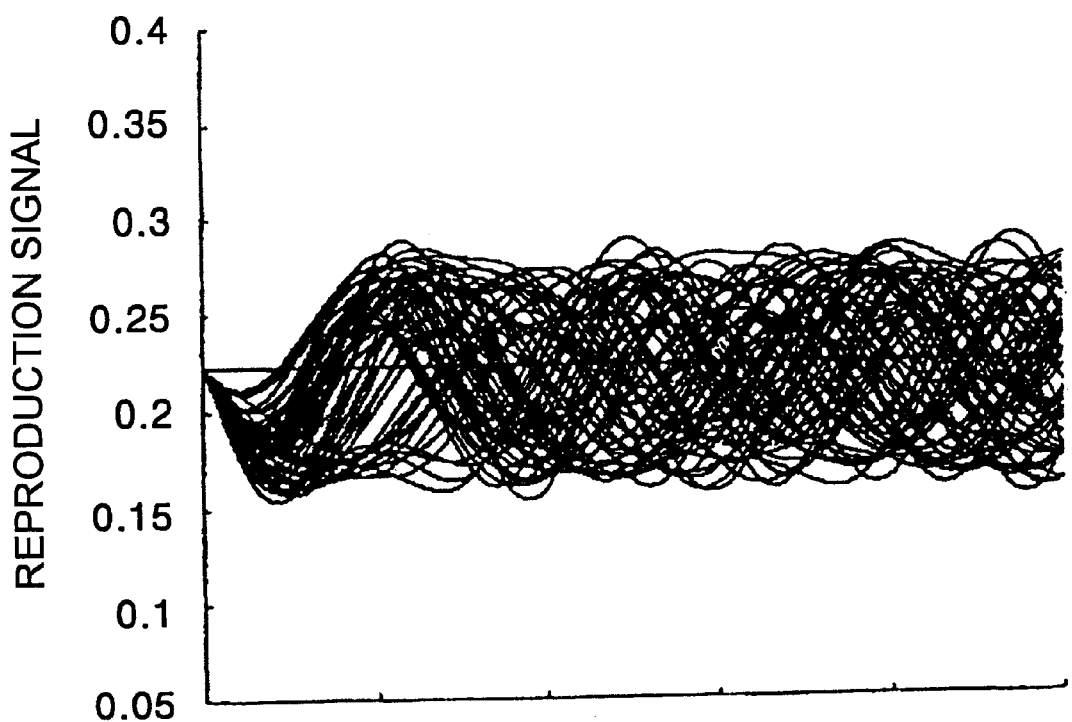
FIG. 9 illustrates an eye-pattern of the signal $S_{sub}$ of FIG. 6.

Referring to FIG. 6, dashed lines indicated by $S_o$ indicate a reproduction signal from a central track of the part of the DVD shown in FIG. 5, which is reproduced with a light source having 650 nm wavelength, and an objective lens designed to be suitable for 0.6-mm thick disc substrate with a NA of 0.6. The value of jittering of the reproduction signal $S_o$ is 8.64%, and an eye-pattern of the signal $S_o$ is shown in FIG. 7. In FIG. 6, solid lines indicated by $S_m$ indicate a reproduction signal from the central track of the part of the DVD shown in FIG. 5, which is reproduced with a light source having a 400 nm wavelength and an objective lens designed to be suitable for a 0.55-mm thick disc substrate. The value of jittering of the reproduction signal is 24.16%, and an eye-pattern of the signal $S_m$ is shown in FIG. 8. Dashed lines indicated by $S_{sub}$ in FIG. 6 indicate a reproduction signal from the DVD of FIG. 5 where a second beam II, to which spherical aberration corresponding to a substrate thickness of 50 μm is caused by adopting the HOE 25, is further focused as a sub-light spot on the recording surface. The value of jittering of the reproduction signal $S_{sub}$ is 30% or more, and the eye-pattern of the signal $S_{sub}$ is shown in FIG. 9.

Figure 10:
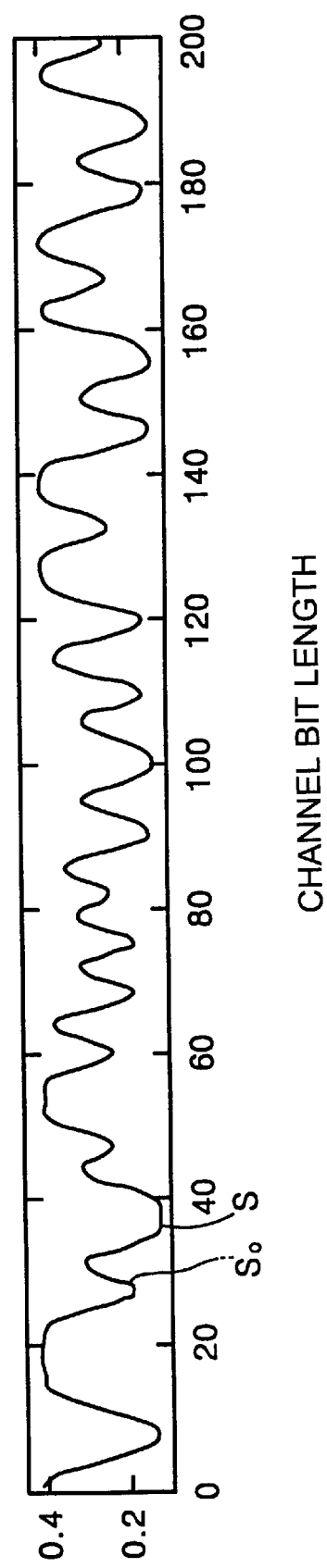
FIG. 10 illustrates reproduction signal S processed using the signals $S_m$ and $S_{sub}$ of FIG. 6 with a gain factor k of 3.5, using equation (3), and further adjusted to include the same DC and AC components as those of signal $S_o$ of FIG. 6.
Figure 11:
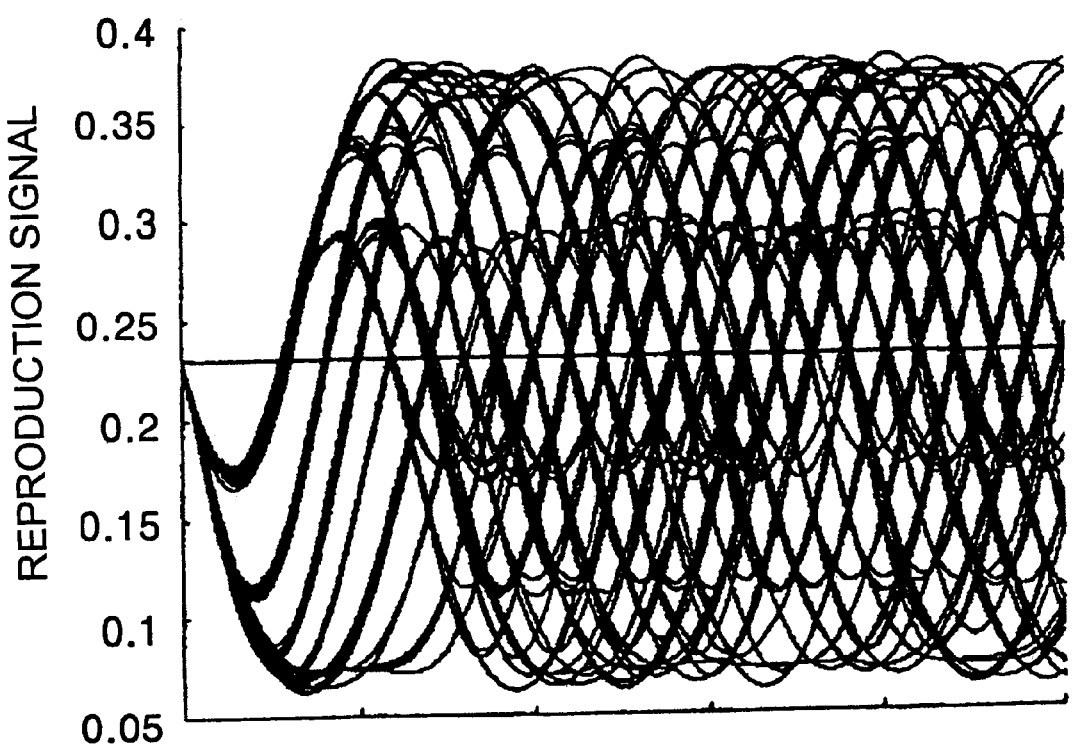
FIG. 11 illustrates an eye-pattern of the reproduction signal S of FIG. 10.

FIG. 10 illustrates a reproduction signal S obtained by correcting for aberration of the signals $S_m$ and $S_{sub}$ using equation (3) above with a gain factor k of 3.5, which is set by the gain adjustor 35 of the second signal processing unit 30 of FIG. 4, i.e., $S=S_m+3.5(S_m-S_{sub})$, and whose DC and AC components are adjusted to be the same as those of the reproduction signal $S_o$. As shown in FIG. 10, the reproduction signals S and $S_o$ are almost the same. The reproduction signal S has an eye-pattern as shown in FIG. 11, and the value of jittering of the reproduction signal S is 8.88%, which is similar to the jittering (8.64%) of the signal $S_o$ reproduced with a light source having 650 nm wavelength and an objective lens optimized for DVDs.

Thus, although a DVD family optical disc is used, the optical pickup according to the present invention, having the configuration of FIG. 4, can output a reproduction signal from which chromatic aberration and/or spherical aberration caused by a thickness difference of disc substrates are/is removed by an operation using equation (3).

Figure 12:
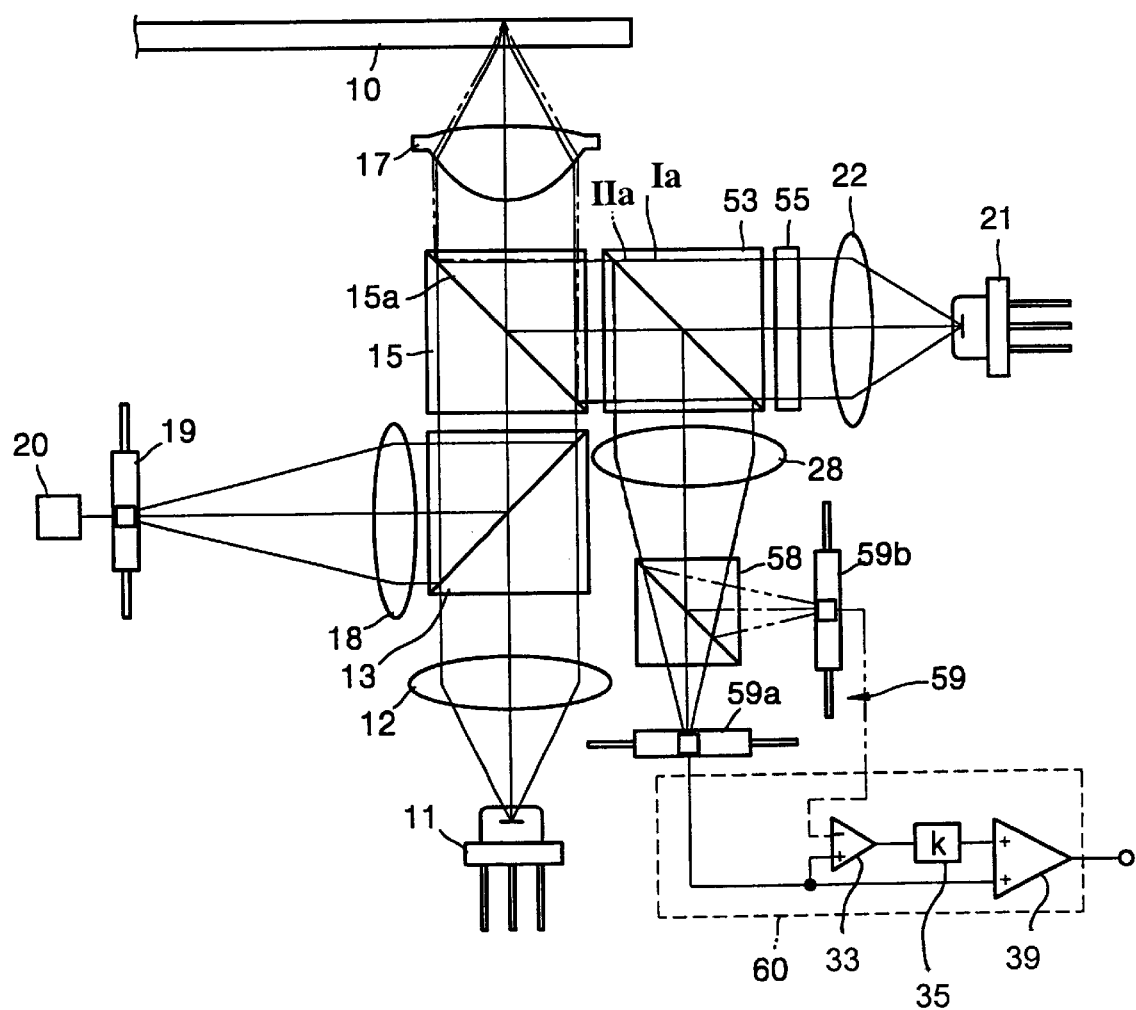
FIG. 12 illustrates an optical arrangement of another embodiment of the compatible optical pickup for high-density recording/reproduction according to the present invention.

FIG. 12 illustrates an optical arrangement of another preferred embodiment of an optical pickup according to the present invention. Referring to FIG. 12, first and second light sources 11 and 21 emit beams having different wavelengths. An objective lens 17 focuses an incident beam to form a light spot on an optical disc 10. First, second and third optical path changers 13, 53 and 15 direct light from a corresponding ones of the light sources to the optical disc and direct light reflected from the optical disc to corresponding ones of the photodetectors. A light splitter splits an incident beam emitted from the second light source 21 to form at least two light spots on the optical disc 10. First and second photodetectors 19 and 59 receive the beam/beams reflected from the optical disc, and first and second signal processing units 20 and 60 detect reproduction signals from electrical signals detected by the first and second photodetectors 19 and 59, respectively. In the embodiment illustrated in FIG. 12, the same elements as those illustrated in FIG. 4 are represented by the same reference numerals, and a description thereof is not further provided here.

As in the embodiment described with reference to FIG. 4, the second light source 21, the second light path changer 53, the light splitter, the second photodetector 59 and the second signal processing unit 60 are used to record an information signal on and/or reproduce an information signal from a DVD family optical disc with a second format.

Light is collimated by the collimating lens 22 after having been emitted from the second light source 21 and the collimated light is split into at least two beams, first and second beams Ia and IIa by the light splitter. The first and second beams Ia and IIa are focused on the optical disc 10 by the objective lens 17 to form a main light spot and a sub-light spot, respectively.

In the embodiment illustrated in FIG. 12, the light splitter may be a polarization HOE 55 which generates a first beam Ia having one polarized component, for example, a P-polarized component, and a second beam IIa having another polarized component, for example, an S-polarized component. Here, the polarization HOE 55 causes a predetermined amount of spherical aberration only to the S-polarized second beam Ia. The first and second beams Ia and IIa are $0^{th}$-order and $1^{st}$-order beams, respectively, diffracted from the polarization HOE 55.

The second optical path changer 53 is arranged on the optical path between the polarization HOE 55 and the third optical path changer 15 and alters the optical path of the incident beam. In the present embodiment, the second optical path changer 53 may be a beam splitter. The beam splitter transmits the incident beam from the second light source 21 regardless of the polarization thereof, such that the beam from the second light source 21 is transmitted toward the third optical path changer 15. The beam splitter reflects an incident beam from the third optical path changer 15 regardless of the polarization thereof, such that the incident beam from the third optical path changer 15 is transmitted toward the second photodetector 59.

Accordingly, the first and second beams Ia and IIa split by the polarization HOE 55 are focused on the optical disc 10 by the objective lens 17. Here, a main light spot from the first beam Ia and the sub-light spot from the second beam IIa are formed on the same track of the optical disc 10. For this reason, the second signal processing unit 60 does not need a delay, unlike the second signal processing unit 30 (see FIG. 4) of the previous embodiment. The main light spot and the sub-light spot have similar characteristics to those of the main light spot and the sub-light spot described in the previous embodiment, except that they have different polarized components.

The optical pickup of FIG. 12 further comprises a polarization beam splitter 58 on the optical path between the second light path changer 53 and the second photodetector 59, which splits the reflected first and second beams Ia and IIa passed through the objective lens 17, the third and second optical path changers 15 and 53 in sequence after having been reflected from the optical disc 10 and passed through the objective lens 17, according their polarization, such that the first and second beams Ia and IIa are transmitted toward first and second light receiving portions 59a and 59b of the second photodetector 59. It will be appreciated that the first and second light receiving portions 59a and 59b of the second photodetector 59 are arranged to separately receive the first and second beams Ia and IIa split by the polarization beam splitter 58.

When reproducing information from a DVD family optical disc with a second format, the second signal processing unit 60 processes the electrical signals having undergone photoelectric conversion after having been received by the first and second light receiving portions 59a and 59b, using equation (3) above, as in the previous embodiment, so that the second signal processing unit 60 outputs a reproduction signal from which chromatic aberration and/or spherical aberration caused by differences in substrate thickness of optical discs are/is corrected. The second signal processing unit 60 has the same structure as that of the second signal processing unit 30 of FIG. 4, except that a delay is not included in the second signal processing unit 60 and one input of differential unit 33 is connected directly to the output of the second light receiving portion 59b instead of to an output of a delay. The constituent elements of the second signal processing unit 60 which are the same as the second signal processing unit 30 of FIG. 4 are designated with the same reference numerals used as in FIG. 4, and description of the elements is not provided here.

Where it is desired to correct for spherical aberration caused by a thickness deviation of future generation DVD family optical discs with a first format, an optical pickup which records information on or reproduces information from a future generation DVD family optical disc with a first format can be constituted similar to the optical system constituted to record information on or reproduce information from a DVD family optical disc with a second format, described previously with reference to FIGS. 4 and 12.

In particular, a light splitter (not shown) is provided between the first light source 11 and the first optical path changer 13 to split an incident beam such that a main light spot, and a sub-light spot including spherical aberration, are focused on the optical disc with the first format. Then, two beams reflected from the optical disc with the first format are received by different light receiving portions (not shown) of the first photodetector 19, respectively, and the first signal processing unit 20 receives and processes electrical signals detected by the different light receiving portions of the first photodetector 19 using a signal processor constructed to implement equation (3), above, such as for example, signal processing unit 30 or signal processing unit 60 discussed above, to output a reproduction signal from which spherical aberration caused by thickness deviation of future generation DVD family optical discs is corrected. The spherical aberration can be removed by adjusting the gain factor k in equation (3).

By focusing a sub-light spot including spherical aberration on an optical disc along with a main light spot and then detecting a reproduction signal through the operation using equation (3) above with the two beams reflected from the optical disc, as described above, chromatic aberration and/or spherical aberration, and coma caused by tilting of the optical disc can be corrected, thereby sharply improving jittering of a reproduction signal.

As previously mentioned, the optical pickup for high-density recording/reproduction according to the present invention has a configuration focuses a sub-light spot including spherical aberration on an optical disc along with a main light spot, and detects a reproduction signal, which is detected by processing two beams corresponding to the main light spot and the sub light spot which are reflected from the optical disc and received by a photodetector, using equation (3).

Use of a single objective lens in the optical pickup according to the present invention makes the configuration of an actuator simple. The optical pickup according to the present invention can correct for chromatic aberration caused by use of a light source having a different wavelength, and/or spherical aberration caused by thickness variations of optical disc substrate, thereby detecting a reproduction signal improved in terms of jittering. Thus, the optical pickup of the present invention is compatible with optical discs having different formats, for example, for future generation DVDs and DVDs.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical pickup compatible for optical discs having different formats, the optical pickup comprising:

a first light source which emits a beam having a relatively short wavelength suitable for a first optical disc with a format;

a second light source which emits a beam having a relatively long wavelength suitable for a second optical disc with another format;

an objective lens, designed to be suitable for the first optical disc and the wavelength of the beam emitted from the first light source, which focuses an incident beam to form a light spot on one of the first and second optical discs;

an optical path changing system which alters a traveling path of the beams emitted from the first and second light sources;

a first photodetector which receives the beam reflected from the first optical disc and passed through the objective lens, the third optical path changer and the first optical path changer after having been emitted from the first light source, and photoelectrically converts the received beam;

a first signal processing unit which detects a reproduction signal of the first optical disc from the signal output from the first photodetector;

a first light splitter which splits an incident beam into at least two beams including first and second beams to be focused by the objective lens as a main light spot and a sub-light spot, respectively, on the second optical disc after having been emitted from the second light source;

a second photodetector having first and second light receiving portions, which receive the first and second beams reflected from the second optical disc after having been emitted from the second light source and photoelectrically converts the received beams to electrical signals; and a second signal processing unit which processes the electrical signals output from the first and second light receiving portions of the second photodetector to correct for chromatic aberration caused by a difference in the wavelengths of the beams emitted from the first and second light sources and/or spherical aberration caused by a thickness difference between the first and second optical discs, to detect a reproduction signal of the second optical disc.

2. The optical pickup of claim 1, wherein the first light source emits blue light and the second light source emits red light.

3. The optical pickup of claim 1, wherein the first light splitter is a holographic optical element (HOE) which causes a predetermined amount of spherical aberration only to the second beam, such that the second beam further includes spherical aberration relative to the first beam.

4. The optical pickup of claim 3, wherein the second signal processing unit further comprises a delay between the output of the first and/or second light receiving portions and at least one input of the second signal processing unit, to delay one of the signals output from the first and second light receiving portions to match the phases of the electrical signals received from the second photodetector.

5. The optical pickup of claim 1, wherein the first light splitter is a polarization holographic optical element (HOE) which generates a first beam having one polarized component and a second beam having another polarized component, and causes a predetermined amount of spherical aberration only to the second beam having the another polarized component, such that the second beam includes spherical aberration relative to the first beam; and the optical pickup further comprises a polarization beam splitter which transmits or reflects the first and second beams reflected from the second optical disc according to the polarization of the first and second beams, wherein the first and second light receiving portions of the second photodetector are arranged to separately receive the first and second beams having different polarized components split by the polarization beam splitter.

6. The optical pickup of claim 1, wherein assuming that a main reproduction signal from the main light spot, which has been received and photoelectrically converted by the first light receiving portion, is $S_m$, a sub-reproduction signal from the sub-light spot, which has been received and photoelectrically converted by the second light receiving portion, is $S_{sub}$, and k is a gain factor, the second signal processing unit process the signals output from the first and second light receiving portions using the equation, $S=S_m+k(S_m-S_{sub})$, to output a final reproduction signal S from which chromatic aberration caused by different wavelengths of the beams emitted from the first and second light sources, and/or spherical aberration caused by thickness difference between the first and second optical discs, are/is corrected.

7. The optical pickup of claim 1, further comprising a second light splitter which splits the beam emitted from the first light source into third and fourth beams to be focused as a main light spot and a sub-light spot on the second optical disc, respectively, wherein the first photodetector includes third and fourth light receiving portions which photoelectrically convert the third and fourth beams reflected from the first optical disc to electrical signals, and the first signal processing portion outputs a reproduction signal from which spherical aberration caused by thickness deviation of the first optical disc is corrected, from the electrical signals photoelectrically converted by the third and fourth light receiving portions.

8. An optical pickup compatible for first and second optical discs having first and second formats, respectively, the optical pickup comprising:

first and second light sources which selectively emit light, a wavelength of the second light source being longer that a wavelength of the first light source;

an objective lens, optimized for the first format optical disc and the wavelength of the first light source, which focuses light from the selected one of the first and second light sources on one of the first and second optical discs;

a light splitter arranged on an optical path between the second light source and the objective lens which splits the light from the second light source and introduces a predetermined amount of spherical aberration to one of the split beams relative to the first beam, the objective lens focusing the split beams on the second optical disc as a main light spot and a sub-light spot respectively;

a first photodetector which receives reflected light corresponding to the first light source and photoelectrically converts the received light, to output a reproduction signal of the first optical disc;

a second photodetector having first and second light receiving portions, which receive reflected light corresponding to the main light spot and the sub-light spot and photoelectrically convert the received beams into first and second electrical signals, respectively; and a signal processing unit which combines the first and second electrical signals to correct for chromatic aberration caused by a difference in the wavelengths of the beams emitted from the first and second light sources and/or spherical aberration caused by a thickness difference between the first and second optical discs, to output a reproduction signal of the second optical disc.

9. The optical pickup of claim 8, wherein the first light source emits blue light and the second light source emits red light.

10. The optical pickup of claim 8, wherein the first light splitter is a holographic optical element (HOE).

11. The optical pickup of claim 8, further comprising a gain adjuster which adjusts an amplitude of one of the first and second electrical signals.

12. The optical pickup of claim 11, further comprising an adder which adds the first and second electrical signals to output the reproduction signal of the second optical disc.

13. The optical pickup of claim 8, further comprising a delay which delays one of the first and second electrical signals to match the phases of the first and second electrical signals.

14. The optical pickup of claim 13, further comprising a gain adjuster which adjusts an amplitude of one of the first and second electrical signals.

15. The optical pickup of claim 14, further comprising an adder which adds the first and second electrical signals to output the reproduction signal of the second optical disc.

16. The optical pickup as claimed in claim 8, wherein the main light spot is offset from the sub-light spot in a track direction of the second optical disc.

17. The optical pickup of claim 8, wherein main light spot is offset from the sub-light spot in a direction transverse to a track direction of the second optical disc.

18. An optical pickup compatible for first and second optical discs having first and second formats, respectively, the optical pickup comprising:

a first light source which selectively emits light having a first wavelength;

a first photodetector;

a first optical system which transmits the light having the first wavelength to the first optical disc and transmits light reflected from the first optical disc to the first photodetector, the first optical system comprising an objective lens optimized for the first wavelength;

a second light source which selectively emits light having a second wavelength;

a second photodetector having first and second light receiving poritons; and a second optical system which transmits the light having the second wavelength to the second optical disc and transmits light reflected from the second optical disc to the second photodetector, the second optical system sharing the objective lens with the first optical system, the second optical system further comprising a light splitter, arranged on an optical path between the second light source and the objective lens, which splits the light from the second light source into first and second split beams and introduces a predetermined amount of spherical aberration to the second split beam relative to the first split beam, the objective lens focusing the first and second split beams on the second optical disc as a main light spot and a sub-light spot respectively, wherein the first and second light receiving portions of the second photodetector receive reflected light corresponding to the main light spot and the sub-light spot and photoelectrically convert the received beams into first and second electrical signals, respectively.

19. The optical pickup of claim 18, further comprising a second signal processing unit which combines the first and second electrical signals to correct for chromatic aberration caused by a difference in the wavelengths of the beams emitted from the first and second light sources and/or spherical aberration caused by thickness difference between the first and second optical discs, to output a reproduction signal of the second optical disc.

20. The optical pickup as claimed in claim 18, wherein the second optical system offsets the main light spot from the sub-light spot in a track direction of the second optical disc.

21. The optical pickup of claim 18, wherein the second optical system offsets the main light spot from the sub-light spot in a direction transverse to a track direction of the second optical disc.

* * * * *